3,128,109
BALL STUD JOINT
William A. Flumerfelt, Columbus, Ohio, assignor to The Columbus Auto Parts Company, Columbus, Ohio, a corporation of Ohio
Filed Jan. 13, 1961, Ser. No. 82,446
1 Claim. (Cl. 287—90)

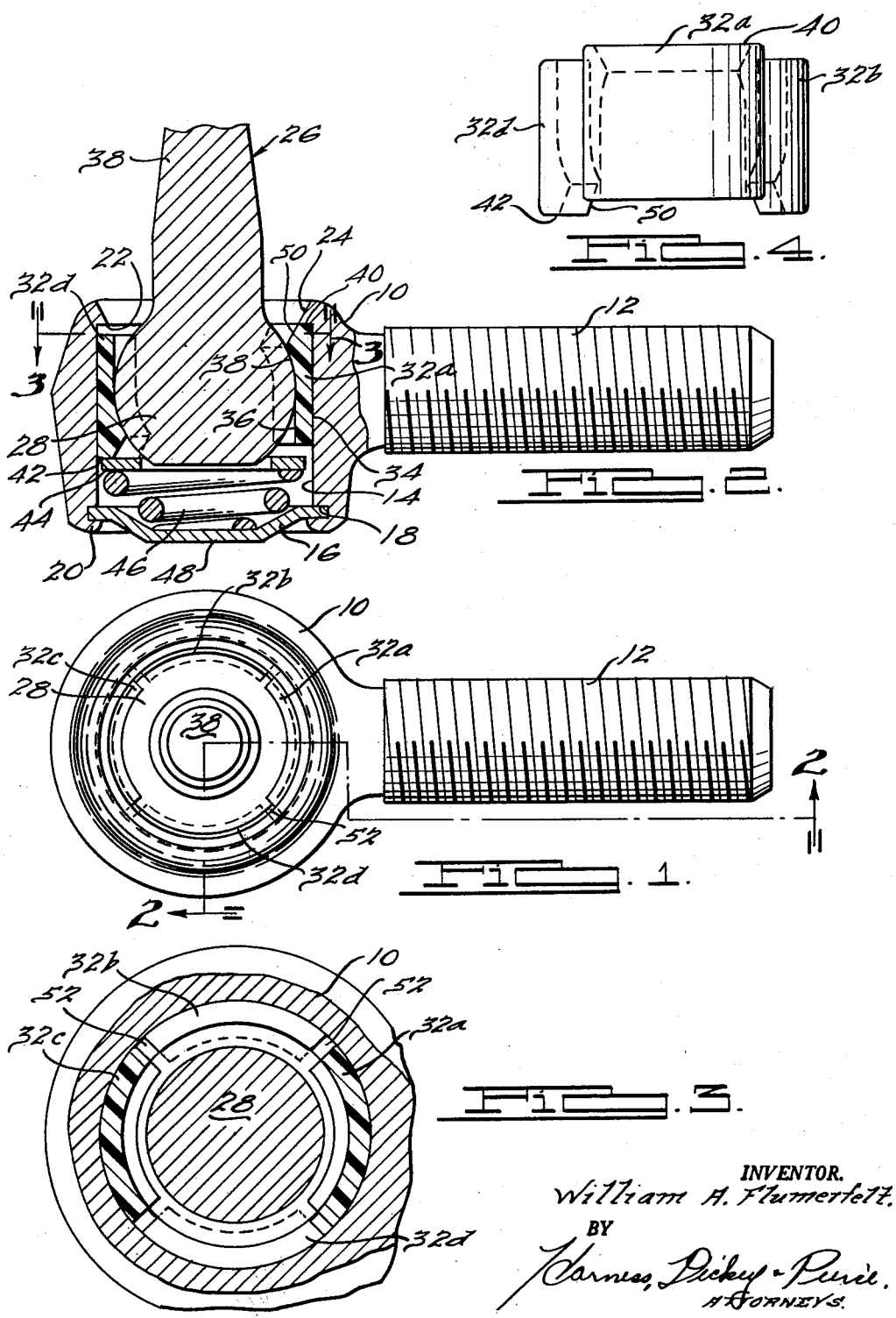

This invention relates to joints and particularly to a ball joint of the type adapted for use in automobile steering linkages or the like.

It is an object of the present invention to provide a ball joint of the type using a ball stud and ball seats for supportingly engaging the ball of the ball stud in which automatic wear take-up means are provided to maintain a relatively uniform engagement under pressure between the ball and the ball seats and to prevent any looseness from developing in the joint.

It is another object of the present invention to provide a ball joint of the above character which may be constructed with the use of low coefficient of friction molded bearing members which eliminate the necessity for frequent lubrication of the joint throughout its life.

It is another object of the present invention to provide a ball joint having a plurality of identical ball seats engaging the ball alternately above and below a median plane through the ball wherein the ball seats are so arranged that the bearing load absorbed by the ball seats is distributed in a balanced manner.

It is still another object of the present invention to provide a ball joint which is rugged in construction, which is made from readily fabricated parts manufactured according to reasonably liberal dimensional tolerances, which is easily assembled, which is generally inexpensive of manufacture and which possesses a long useful life.

These and other objects of the present invention will become apparent from the following detailed description taken in conjunction with the accompanying drawing wherein:

FIGURE 1 is a plan view of a ball joint embodying the principles of the present invention;

FIG. 2 is a sectional view of the structure illustrated in FIG. 1, taken along the line 2—2 thereof;

FIG. 3 is a sectional view of the structure illustrated in FIG. 2, taken along the line 3—3 thereof; and FIG. 4 is an elevational view of the ball seat members illustrated in FIGS. 1-3, removed from their adjacent structure and illustrating the relative positions of the ball seats in an assembled joint.

Referring now to the drawing, the joint is illustrated in the form of a tie rod connector including a housing or socket 10 having an integrally formed threaded tenon 12. The socket 10 is formed with an opening or cavity 14 in the form of a circular cylindrical bore. The bore 14 is closed at its one end by a closure plate 16 which is held against a shoulder 18 formed adjacent the lower end of the bore 14 by means of a lip 20 which is crimped over the edge of the closure plate 20 after assembly of the several parts of the joint. An annular shoulder 22 is formed adjacent the upper end of the cavity 14 and surrounds an opening 24 in the top of the socket. A ball and ball stud member 26 is supported with its segmentally spherical ball portion 28 disposed within the bore 14 and with its stud portion 30 extending out through the opening 24.

Disposed within the bore 14 between the wall thereof and the ball 28 are a plurality of identical ball seat members 32a, 32b, 32c and 32d. The ball seat members have segmentally cylindrical outer surfaces 34, while their inner surfaces are contoured to define a segmentally cylindrical portion 36 at one end thereof and a segmentally spherical portion 38 at the other end thereof, blending into the cylindrical portion 36. The ball seat members 32a and 32c, which are opposite one another, are alternately arranged with respect to the opposite ball seat members 32b and 32d, and the spherical portions 38 of the ball seats 32a and 32c engage the ball 28 on the top thereof, while the segmentally spherical portions 38 of the two ball seats 32b and 32d engage the ball 28 on the bottom or lower side thereof. Otherwise stated, the spherical portions 38 of two of the ball seats 32a and 32c are disposed above a median plane extending through the center of the ball and normal to the axis of the bore 14, while the segmentally spherical portions 38 of the other two ball seats 32b and 32d are disposed below said plane. As may be seen in FIG. 1, the ball seats 32a and 32c engage the annular shoulder 22 at the under ends 40 thereof, while a gap exists between the upper ends 40 of the ball seats 32b and 32d and the shoulder 22. The lower ends 42 of the ball studs 32b and 32d are engaged by and seat on a flat annular plate or washer 44, while a gap exists between the washer 44 and the lower ends 42 of the ball seats 32a and 32c. The washer 44 is held against the ball seats 32b and 32d by a coil spring 46 which seats in a depressed portion 48 of the closure disk 16. It will also be seen that each of the identical ball seats is relieved at 50, which, in the case of ball seats 32a and 32c, prevents the ball seats from unduly limiting the angle through which the ball stud 26 may be oscillated.

As the segmentally spherical portions 38 of the ball seats wear during usage of the joint, the coil spring 46 will operate to take up this wear by forcing the ball seats 32b and 32d against the bottom of the ball 28 which thus moves the entire ball up to force the top of the ball up into tighter engagement with the segmentally spherical portions 38 of the ball seats 32a and 32c. Thus the tightness with which the ball stud 26 is held by the ball seats will remain relatively constant irrespective of the wear of the parts.

While the housing 10 and its tenon 12 are preferably formed from a steel forging, as is the ball and ball stud member 26 and all other parts of the assembly except the ball seats 32a, 32b, 32c and 32d, the ball seats are desirably formed from a molded, low coefficient of friction material, such as nylon, Teflon, Vulcolan "C" or the like. Also, due to the fact that each of the ball seats is identical, they may be formed in the same mold. When using such materials, the joint is intended to operate throughout its useful life without periodic lubrications. While the joint may be initially filled with lubricant, this initial lubrication should not require replacement over a very long period of use.

As may be seen in FIG. 3, each of the ball seats 32 engages the ball about the lateral circumference thereof by an amount slightly less than 90 degrees. Thus, gaps 52 are left which may be filled by lubricant. However, should the ball seats work into a position in which they are in end-to-end abutment, with one large gap being left rather than four equally spaced gaps, the amount of this gap will not be so great as to impair the operation of the joint. The gaps 52, however, do permit relatively liberal dimensional variations in the ball seats to be absorbed without difficulty. Thus, the ball seats 32 may be made by mass production techniques in an expeditious manner.

In the embodiment illustrated herein, the bore 14 is of circular cylindrical shape. It will, of course, be apparent that a cylindrical bore of other cross-sectional shape would operate satisfactorily and accordingly the expression "cylindrical" is not intended to be limited to circular cylindrical.

While it will be apparent that the embodiment of the invention herein disclosed is well calculated to fulfill the objects of the invention, it will be appreciated that the invention is susceptible to modification, variation and change

What is claimed is:

A ball joint including a ball stud having a segmental ball and a stud, a socket member having a cavity for receiving said ball and an opening through which said stud extends, at least four ball seat elements in said cavity each having an inwardly projecting segmental spherical portion disposed at one end thereof, said ball seat elements being arranged in first and second groups, the inwardly projecting portions of the ball seat elements of said first group engaging said ball on one side of a transverse plane through said cavity which includes the center of said ball and the inwardly projecting portions of said second group engaging said ball on the other side of said transverse plane, the ball seat elements of said first and second groups being alternately arranged in said cavity, shoulder means at one end of said cavity engageable by the ball seat elements of said first group, the ball seat elements of said second group being spaced from said shoulder, and means at the other end of said cavity spaced from the ball seat elements of said first group and engageable with the ball seat elements of said second group operable to apply a force thereto from a common source urging the ball seat elements of said second group toward said shoulder to tightly confine said ball under pressure between the projecting portions of said ball seat elements.

References Cited in the file of this patent

UNITED STATES PATENTS

| 2,496,869 | Flumerfelt | Feb. 7, 1950 |
| 2,708,590 | Latzen | May 17, 1955 |

FOREIGN PATENTS

| 1,014,441 | Germany | Aug. 22, 1957 |